(12) United States Patent
Baun et al.

(10) Patent No.: US 11,181,097 B2
(45) Date of Patent: Nov. 23, 2021

(54) MULTIROTOR WIND TURBINE WITH GUY WIRES

(71) Applicant: Vestas Wind Systems A/S, Aarhus N. (DK)

(72) Inventors: Torben Ladegaard Baun, Skødstrup (DK); Peter Bøtteher, Egå (DK); Jesper Lykkegaard Neubauer, Hornslet (DK); Leif Christoffersen, Vejle Øst (DK)

(73) Assignee: Vestas Wind Systems A/S, Aarhus N. (DK)

( * ) Notice: Subject to any disclaimer, the term of this patent is extended or adjusted under 35 U.S.C. 154(b) by 188 days.

(21) Appl. No.: 16/610,724

(22) PCT Filed: Jun. 12, 2018

(86) PCT No.: PCT/DK2018/050134
§ 371 (c)(1),
(2) Date: Nov. 4, 2019

(87) PCT Pub. No.: WO2018/233784
PCT Pub. Date: Dec. 27, 2018

(65) Prior Publication Data
US 2021/0277866 A1    Sep. 9, 2021

(30) Foreign Application Priority Data

Jun. 19, 2017 (DK) .......................... PA 2017 70479

(51) Int. Cl.
*F03D 13/20* (2016.01)
*E04H 12/20* (2006.01)
(Continued)

(52) U.S. Cl.
CPC .......... *F03D 7/0204* (2013.01); *E04H 12/20* (2013.01); *F03D 1/02* (2013.01); *F03D 13/20* (2016.05);
(Continued)

(58) Field of Classification Search
CPC . E04H 12/20; F03D 13/20; F03D 1/02; F03D 7/0204; F05B 2240/37; F05B 2240/912; Y02E 10/72; Y02E 10/728
(Continued)

(56) References Cited

U.S. PATENT DOCUMENTS 4,710,100 A    12/1987  Laing et al.
4,832,571 A *  5/1989   Carrol ..................... F03D 13/20
                                                          416/132 B
(Continued)

FOREIGN PATENT DOCUMENTS

CN    1044326 A      8/1990
CN    101059123 A   10/2007
(Continued)

OTHER PUBLICATIONS

European Patent Office, International Search Report and Written Opinion in PCT Application No. PCT/DK2018/050134, dated Sep. 6, 2018.
Danish Patent and Trademark Office, Search and Exam Report in PA 2017 70479, dated Dec. 19, 2017.
China National Intellectual Property Administration, First Notification of Office Action in CN Application No. 201880036023.4, dated Jun. 24, 2020.

*Primary Examiner* — Tulsidas C Patel
*Assistant Examiner* — S. Mikailoff
(74) *Attorney, Agent, or Firm* — Wood Herron & Evans LLP

(57) ABSTRACT

A multirotor wind turbine (1) comprising a tower structure (2) and at least one load carrying structure (3), each load carrying structure (3) being arranged to carry two or more energy generating units (5), is disclosed. The wind turbine (1) further comprises a yawing arrangement (6) comprising
(Continued)

a first part (9) being fixedly connected to the tower structure (2) and a second part (10) being fixedly connected to at least one of the load carrying structure(s) (3). The first part (9) and the second part (10) are configured to perform rotating movements relative to each other, thereby allowing the load carrying structure (3) to perform yawing movements relative to the tower structure (2). At least one guy wire (7) is connected between an anchoring point (8) at the ground and the first part (9) of the yawing arrangement (6). The invention further provides a yawing arrangement (6) for such a multirotor wind turbine (1).

7 Claims, 8 Drawing Sheets

(51) Int. Cl.
*F03D 1/02* (2006.01)
*F03D 7/02* (2006.01)
(52) U.S. Cl.
CPC ..... *F05B 2240/37* (2020.08); *F05B 2240/912* (2013.01)
(58) Field of Classification Search
USPC .................................................... 290/44, 55
See application file for complete search history.

(56) References Cited

U.S. PATENT DOCUMENTS

| | | |
|---|---|---|
| 5,146,096 A | 9/1992 | McConachy |
| 2004/0219018 A1 | 11/2004 | Selsam |
| 2005/0214117 A1 | 9/2005 | Selsam |
| 2018/0003158 A1* | 1/2018 | Pedersen ................. E04H 12/20 |
| 2018/0355850 A1* | 12/2018 | Baun ....................... F03D 13/20 |

FOREIGN PATENT DOCUMENTS

| | | |
|---|---|---|
| CN | 101949353 A | 1/2011 |
| CN | 102269113 A | 12/2011 |
| CN | 103122828 A | 5/2013 |
| CN | 105819299 A | 8/2016 |
| CN | 109072867 A | 12/2018 |
| DE | 102012020052 B3 | 4/2014 |
| GB | 2443886 A | 5/2008 |
| KR | 20160095918 A | 8/2016 |
| WO | 2010098813 A1 | 9/2010 |
| WO | 2016128005 A1 | 8/2016 |
| WO | 2017178025 A1 | 10/2017 |

* cited by examiner

MULTIROTOR WIND TURBINE WITH GUY WIRES

FIELD OF THE INVENTION

The present invention relates to a multirotor wind turbine being provided with at least one guy wire. In the multirotor wind turbine of the invention, the guy wire(s) is/are attached to a part of a yawing arrangement. The present invention further relates to a yawing arrangement for use in such a multirotor wind turbine.

BACKGROUND OF THE INVENTION

Wind turbines normally comprise one or more energy generating units, each energy generating unit comprising a hub carrying one or more wind turbine blades. The wind acts on the wind turbine blades, thereby causing the hub to rotate. The rotational movements of the hub are transferred to a generator, either via a gear arrangement or directly, in the case that the wind turbine is of a so-called direct drive type. In the generator, electrical energy is generated, which may be supplied to a power grid.

Some wind turbines are provided with two or more energy generating units in order to increase the total power produced by the wind turbine, without having to provide the wind turbine with one very large, and therefore heavy, energy generating unit. Such wind turbines are sometimes referred to as 'multirotor wind turbines'.

In multirotor wind turbines the energy generating units may be carried by a load carrying structure which is, in turn, connected to a tower structure. For instance, the load carrying structure may comprise two arms, each extending away from the tower structure, and each carrying at least one energy generating unit. The load carrying structure may be connected to the tower structure via a yawing arrangement which allows the entire load carrying structure to perform yawing movements relative to the tower structure. Thereby the wind turbine blades of all of the energy generating units carried by the load carrying structure can be directed into the incoming wind simultaneously, by means of the yawing arrangement.

Wind turbine towers may be provided with guy wires, i.e. wires which are connected between an anchoring point on the ground and an attachment point on the wind turbine tower. Such guy wires are used for providing a stable tower structure with minimum tower dimensions. The guy wires should be attached to the tower structure at a position which ensures that collisions between the wind turbine blades and the guy wires are prevented.

DESCRIPTION OF THE INVENTION

It is an object of embodiments of the invention to provide a multirotor wind turbine with guy wires, where the guy wires can be mounted on the wind turbine in a cost efficient manner.

It is a further object of embodiments of the invention to provide a multirotor wind turbine with guy wires, where the stability of the wind turbine is increased as compared to prior art wind turbines.

According to a first aspect the invention provides a multirotor wind turbine comprising:
  a tower structure,
  at least one load carrying structure, each load carrying structure being arranged to carry two or more energy generating units,
  a yawing arrangement comprising a first part being fixedly connected to the tower structure and a second part being fixedly connected to at least one of the load carrying structure(s), the first part and the second part being configured to perform rotating movements relative to each other, thereby allowing the load carrying structure to perform yawing movements relative to the tower structure, and
  at least one guy wire being connected between an anchoring point at the ground and the first part of the yawing arrangement.

Thus, the multirotor wind turbine according to the first aspect of the invention comprises a tower structure and at least one load carrying structure. In the present context the term 'tower structure' should be interpreted to mean a generally vertically arranged structure, e.g. in the form of a pylon or the like. Accordingly, the tower structure resembles a traditional wind turbine tower for a single rotor wind turbine.

Each load carrying structure is connected to the tower structure, and each load carrying structure is arranged to carry two or more energy generating units. Accordingly, the energy generating units are not mounted directly on the tower structure, but are instead mounted on the load carrying structure(s), which is/are in turn connected to the tower structure, i.e. the energy generating units are mounted on the tower structure via the load carrying structure(s).

In the present context the term 'energy generating unit' should be interpreted to mean a part of the wind turbine which actually transforms the energy of the wind into electrical energy. Each energy generating unit thereby typically comprises a rotor, carrying a set of wind turbine blades, and a generator. The energy generating unit may further comprise a gear arrangement interconnecting the rotor and the generator. The generator, and possibly the gear arrangement, may be arranged inside a nacelle.

The multirotor wind turbine further comprises a yawing arrangement comprising a first part and a second part. The first part is fixedly connected to the tower structure and the second part is fixedly connected to at least one of the load carrying structure(s). The first part and the second part are configured to perform rotating movements relative to each other. When the first part and the second part perform rotating movements relative to each other, a corresponding relative rotational movement takes place between the tower structure and the load carrying structure(s), due to the fixed connection between the first part and the tower structure, on the one hand, and the second part and the load carrying structure, on the other hand. Accordingly, the load carrying structure(s) are able to perform yawing movements relative to the tower structure, via the yawing arrangement. Thereby all of the energy generating units carried by a given load carrying structure can be simultaneously directed into the incoming wind. Furthermore, the yawing arrangement forms an interface between the tower structure and the load carrying structure(s), i.e. the load carrying structure(s) is/are connected to the tower structure via the yawing arrangement.

The multirotor wind turbine may comprise only one load carrying structure. In this case this load carrying structure is connected to the tower structure via one yawing arrangement.

Alternatively, the multirotor wind turbine may comprise two or more load carrying structures. In this case the load carrying structures may each be connected to the tower structure via a separate yawing arrangement. In this case the load carrying structures perform yawing movements relative to the tower structure independently of the yawing movements of the other load carrying structure(s). As an alternative, two or more load carrying structures may be connected to the tower structure via the same yawing arrangement, in which case the load carrying structures are yawed together.

The yawing arrangement may comprise a single yaw bearing, where the first part forms part of one side of the yaw bearing and the second part forms part of the other side of the yaw bearing. In this case a bearing interface between the two sides of the yaw bearing may be arranged substantially horizontally, i.e. substantially perpendicular to a longitudinal axis defined by the tower structure. As an alternative, the bearing interface may be arranged circumferentially with respect to the tower structure.

Alternatively, the yawing arrangement may comprise two or more yaw bearings arranged with a distance there between along the longitudinal direction defined by the tower structure.

The bearing interface between the first part of the yawing arrangement and the second part of the yawing arrangement may be in the form of a sliding bearing interface, a roller bearing interface, a ball bearing interface, or any other suitable kind of bearing interface.

At least one guy wire is connected between an anchoring point at the ground and the first part of the yawing arrangement. Accordingly, the guy wire(s) is/are connected to the part of the yawing arrangement which is fixedly connected to the tower structure. Thereby the guy wire(s) remain(s) stationary along with the tower structure when the load carrying structure performs yawing movements relative to the tower structure. As described above, guy wires are normally used for stabilising the tower structure, thereby allowing a smaller foundation and/or thinner walls of the tower structure without compromising the capability of the tower structure for handling expected loads during operation.

Each guy wire may be connected to the first part of the yawing arrangement at a separate connecting point. As an alternative, a given connecting point at the first part of the yawing arrangement may be used for connecting two or more guy wires to the first part of the yawing arrangement, even though the guy wires are connected to separate anchoring points at the ground.

It is an advantage that the guy wire(s) is/are connected to the first part of the yawing arrangement for several reasons. For instance, this allows the guy wire(s) to be mounted on the tower structure without weakening the actual tower structure. For instance, it is not necessary to perform welding directly on the tower wall in order to connect the guy wire(s) thereto. Accordingly, the guy wire(s) can be connected to the wind turbine without having to fortify or strengthen the tower structure. Furthermore, the guy wire(s) is/are connected to the tower structure at a relatively high level, thereby providing good stability for the tower structure. This is possible without risking collisions between the wind turbine blades and the guy wire(s) because the energy generating units are mounted on the load carrying structure(s), and thereby at a distance from the tower structure. Finally, this is cost effective, for instance because no additional measures need to be taken in order to fortify or strengthen the tower structure.

The guy wire(s) may be connected to an exterior portion of the first part of the yawing arrangement. According to this embodiment, each guy wire is connected directly to an outer surface of the first part of the yawing arrangement, e.g. via a mounting structure, such as a loop or an eyelet.

As an alternative, the guy wire(s) may extend through the first part of the yawing arrangement, and the guy wire(s) may be connected to an interior portion of the first part of the yawing arrangement. This results in a smoother outer surface of the tower structure and yawing arrangement than is the case when the guy wire(s) is/are connected to an exterior portion of the first part of the yawing arrangement. Furthermore, the connecting point(s) between the guy wire(s) and the first part of the yawing arrangement can be accessed from inside the tower structure, thereby providing easier access for maintenance, tightening of the guy wire(s), etc. Finally, in the case that two or more guy wires are provided, these may be tightened in one operation and from a single point.

The guy wire(s) may additionally or alternatively extend through a wall of the tower structure in order to reach a connection point at an interior portion of the first part of the yawing arrangement.

In the case that the guy wire(s) is/are connected to an interior portion of the first part of the yawing arrangement, the multirotor wind turbine may further comprise a hoisting mechanism arranged inside an outer periphery defined by the tower structure and/or the yawing arrangement, the hoisting mechanism being configured to hoist the guy wire(s) to a mounting position.

According to this embodiment, the guy wire(s) may be connected to the first part of the yawing arrangement in the following manner. When the yawing arrangement has been mounted in the tower structure, pilot wires attached to the hoisting mechanism are guided through connecting structures on the interior portion of the first part of the yawing arrangement and lowered towards the ground. At the ground, the guy wires are attached to the pilot wires, which are then hoisted towards the yawing arrangement, pulling the guy wires through the first part of the yawing arrangement and/or through the wall of the tower structure, to the position of the connecting structures. The guy wires are finally connected to the connecting structures on the interior portion of the first part of the yawing arrangement.

The hoisting mechanism may be a temporary installation which can be mounted inside the outer periphery defined by the tower structure and/or the yawing arrangement when hoisting of one or more guy wires towards the yawing arrangement is required, and dismantled again when the hoisting has been completed. As an alternative, the hoisting mechanism may be permanently mounted in the wind turbine.

The hoisting mechanism may comprise one or more winches and/or one or more pulleys. Alternatively or additionally, the hoisting mechanism may comprise beam elements or rod elements for ensuring that the guy wires are hoisted towards the yawing arrangement at a suitable angle. However, this may require a guide provided on an exterior part of the tower structure or the yawing arrangement for ensuring that the guy wire passes through the tower wall and/or the yawing arrangement at a suitable angle.

The first part of the yawing arrangement may be or comprise a yaw ring, and the second part of the yawing arrangement may be or comprise one or more yaw drive units. According to this embodiment, the yaw ring is fixedly connected to the tower structure, while the yaw drive units move along with the load carrying structure during yawing.

As an alternative, the first part of the yawing arrangement may be or comprise one or more yaw drive units, and the second part of the yawing arrangement may be or comprise a yaw ring. According to this embodiment, the yaw drive units are fixedly connected to the tower structure, while the yaw ring moves along with the load carrying structure during yawing.

As an alternative to a yawing arrangement comprising a toothed yaw ring a toothed yaw drive units, other kinds of yawing mechanisms could be used, such as a yawing mechanism based on hydraulic cylinders, chain drives, or any other suitable kind of drive mechanism. The interface between the first part of the yawing arrangement and the second part of the yawing arrangement could be arranged substantially horizontally or perpendicularly to the longitudinal axis defined by the tower structure, or it could be arranged substantially vertically or in parallel with the longitudinal axis defined by the tower structure.

The first part of the yawing arrangement may be a casted part. Casting is a very cost effective manufacturing process, and the yawing arrangement is therefore cost effective in this case. Furthermore, connecting structures for connecting the guy wires to the first part of the yawing arrangement can be formed directly in the casted part. This provides a very strong connection between the guy wires and the first part of the yawing arrangement.

Alternatively or additionally, the second part of the yawing arrangement could be a casted part.

At least one of the load carrying structure(s) may comprise two arms extending away from the tower structure, each arm being arranged to carry one or more energy generating units. According to this embodiment, the energy generating units are positioned at a distance from the longitudinal axis defined by the tower structure, and thereby the guy wires are arranged well clear of the rotating wind turbine blades.

According to a second aspect the invention provides a yawing arrangement for use in a multirotor wind turbine according to the first aspect of the invention, the yawing arrangement comprising a first part being configured to be fixedly connected to a tower structure and a second part being configured to be fixedly connected to a load carrying structure, the first part and the second part being configured to perform rotating movements relative to each other, wherein the first part is provided with one or more connecting structures for connecting one or more guy wires to the first part of the yawing arrangement.

The yawing arrangement according to the second aspect of the invention is for use in a multirotor wind turbine according to the first aspect of the invention, and it has therefore already been described above with reference to the first aspect of the invention. Accordingly, the remarks set forth above are equally applicable here.

The connecting structure(s) may be arranged on an exterior portion of the first part of the yawing arrangement. This has already been described above.

Alternatively, the connecting structure(s) may be arranged on an interior portion of the first part of the yawing arrangement, and the first part of the yawing arrangement may further be provided with one or more through-going passages allowing a guy wire to pass through the first part of the yawing arrangement. This has also been described above.

BRIEF DESCRIPTION OF THE DRAWINGS

The invention will now be described in further detail with reference to the accompanying drawings in which.

DETAILED DESCRIPTION OF THE DRAWINGS

Figure 1:
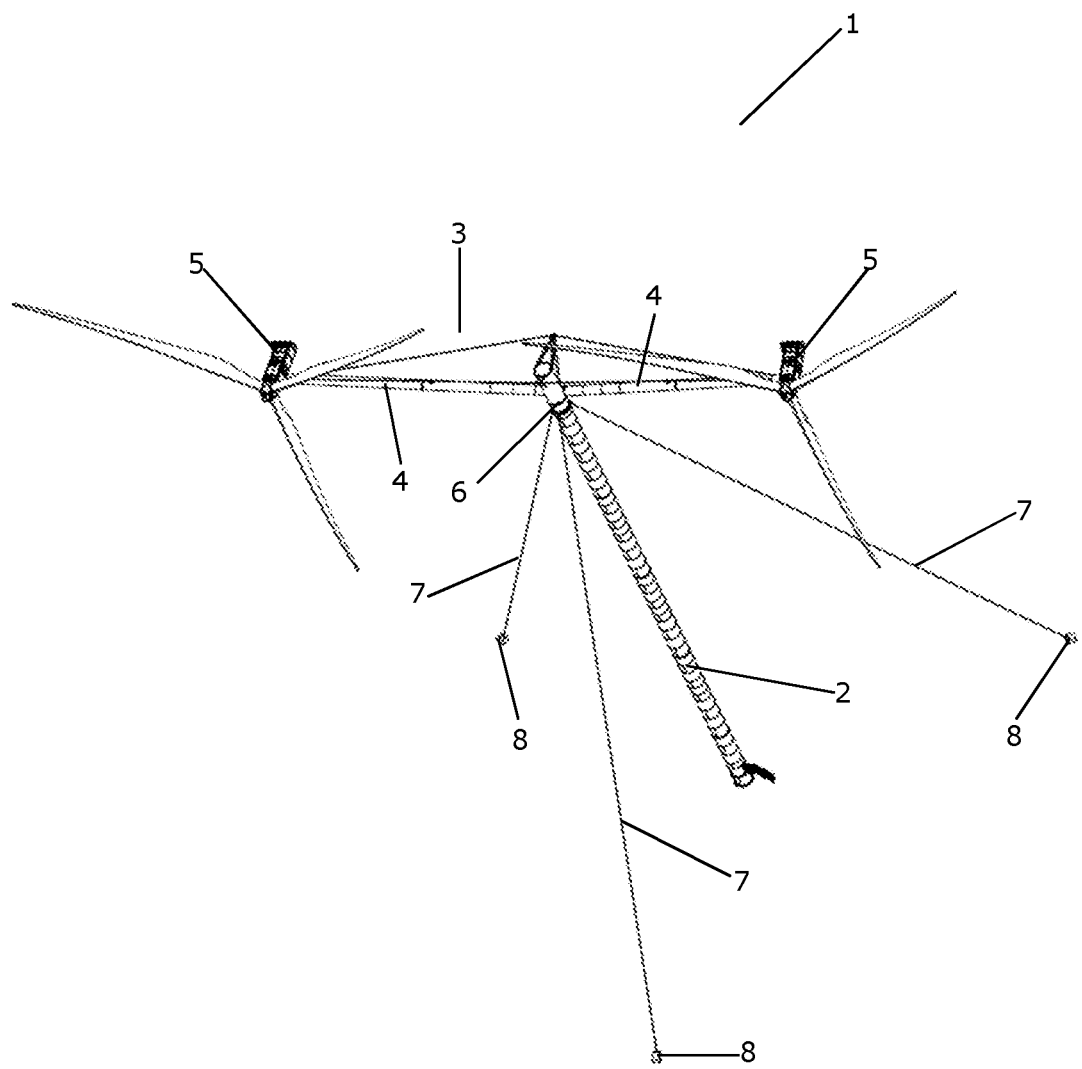
FIG. 1 is a perspective view of a multirotor wind turbine according to an embodiment of the invention.

FIG. 1 is a perspective view of a multirotor wind turbine 1 according to an embodiment of the invention. The multirotor wind turbine 1 comprises a tower structure 2 and a load carrying structure 3 comprising two arms 4, each extending away from the tower structure 2. Each arm 4 carries an energy generating unit 5.

The load carrying structure 3 is connected to the tower structure 2 via a yawing arrangement 6. The yawing arrangement 6 comprises a first part (not shown) which is fixedly connected to the tower structure 2 and a second part (not shown) which is fixedly connected to the load carrying structure 3. The first part and the second part are configured to perform rotating movements relative to each other. This allows the load carrying structure to perform yawing movements relative to the tower structure 2 in order to direct the energy generating units 5 into the incoming wind.

The multirotor wind turbine 1 further comprises three guy wires 7 being connected between anchoring points 8 at the ground and the first part of the yawing arrangement 6. The guy wires 7 provide stability to the wind turbine 1, and for instance allow a slimmer design of the tower structure 2 and/or a smaller foundation, without compromising the capability of the wind turbine 1 to handle expected loads during operation.

It is an advantage that the guy wires 7 are attached to the first part of the yawing arrangement 6 rather than being attached on the tower structure 2, because this is cost effective, and weakening of the tower structure 2 is avoided.

Figure 2:
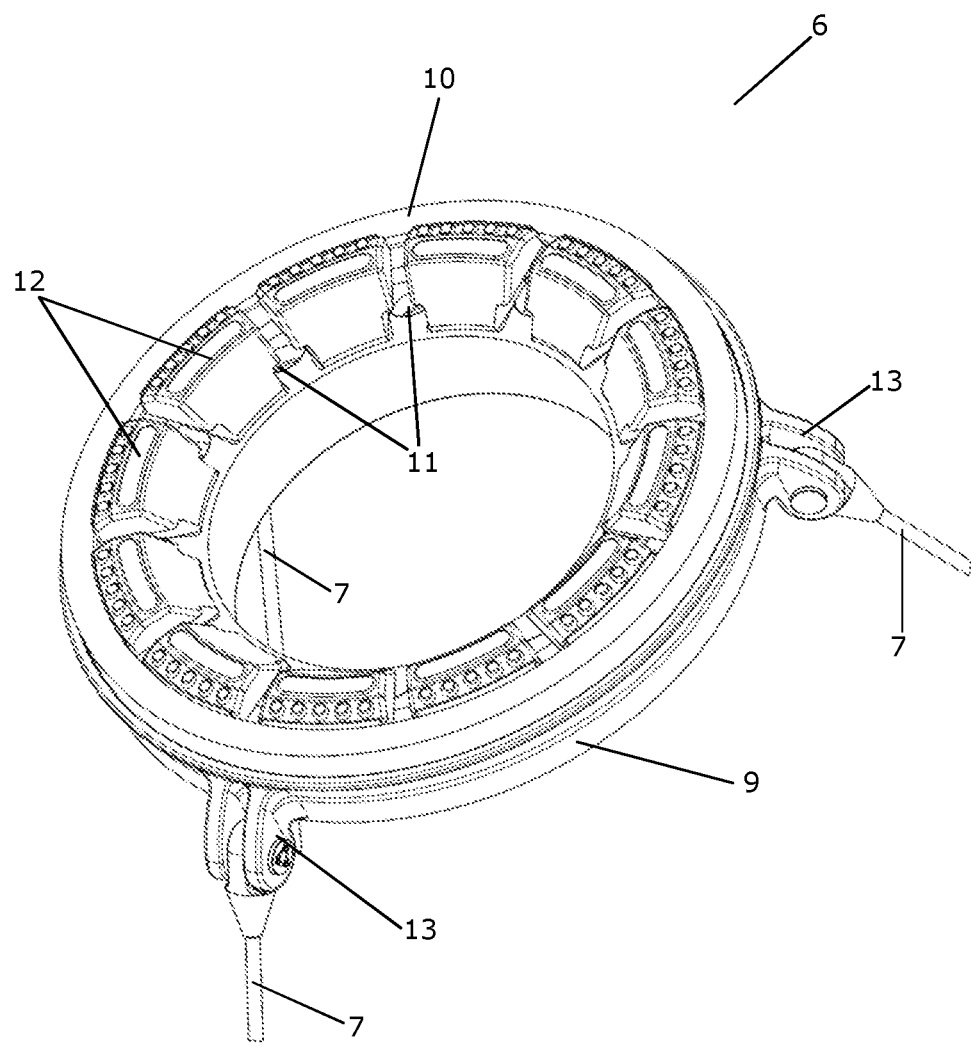
FIGS. 2-4 illustrate a yawing arrangement according to a first embodiment of the invention.
Figure 3:
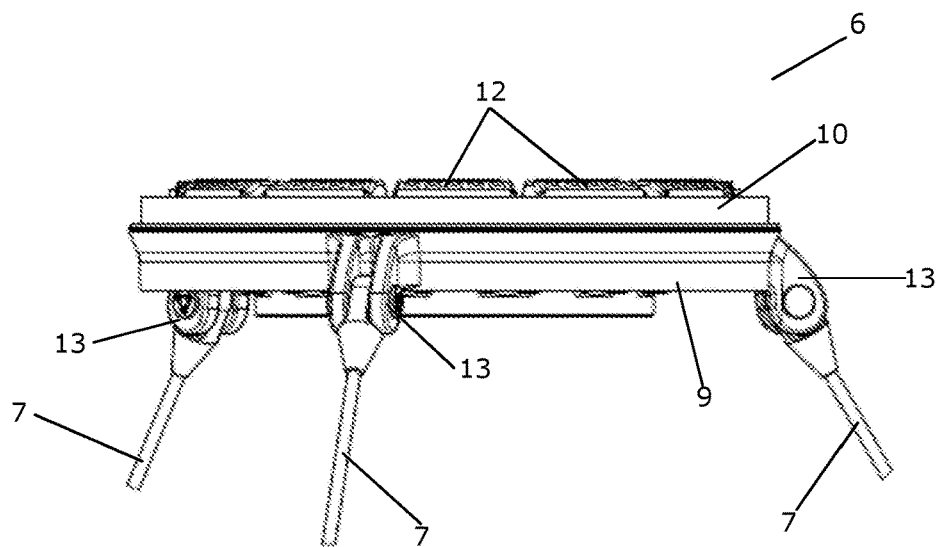
Figure 4:
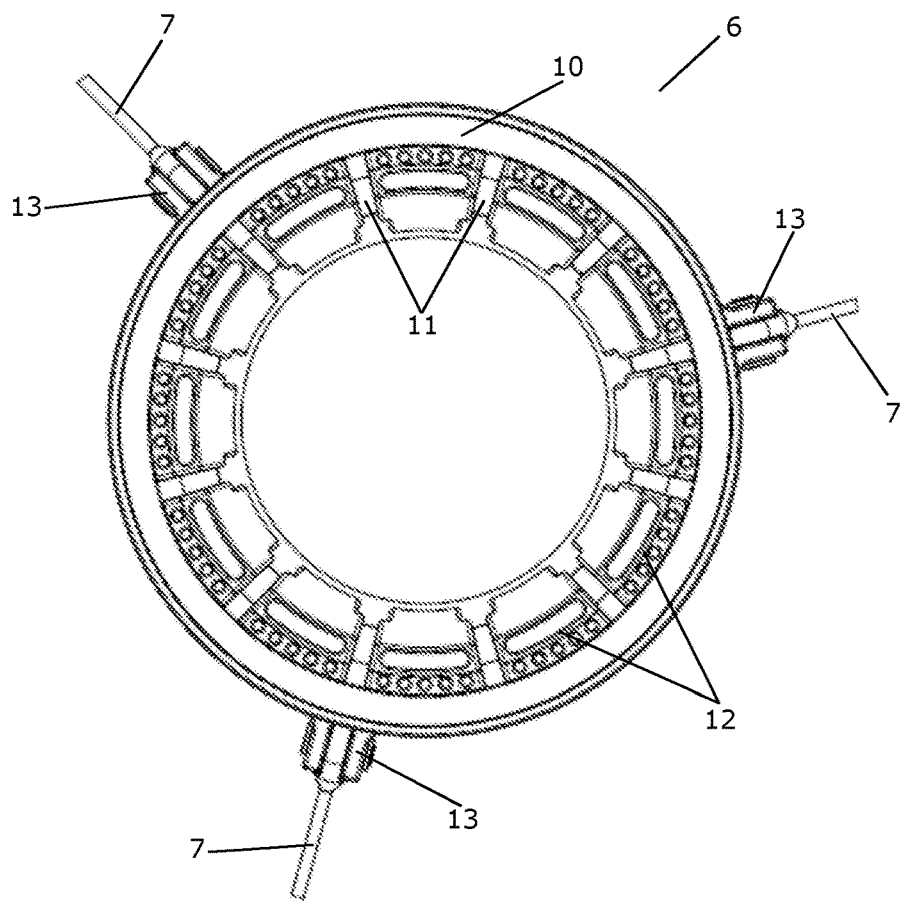

FIGS. 2-4 illustrate a yawing arrangement 6 according to a first embodiment of the invention. FIG. 2 is a perspective view of the yawing arrangement 6, FIG. 3 is a side view of the yawing arrangement 6, and FIG. 4 is a top view of the yawing arrangement 6. The yawing arrangement 6 of FIGS. 2-4 could, e.g., form part of the wind turbine 1 of FIG. 1.

The yawing arrangement 6 comprises a first part 9 being configured to be fixedly connected to a tower structure of a wind turbine, and a second part 10 being configured to be fixedly connected to a load carrying structure of a wind turbine. The first part 9 comprises a number of openings 11 arranged to receive yaw drives (not shown). The second part 10 is in the form of a yaw ring arranged to engage with the yaw drives. The second part 10 is further provided with a number of sliding units 12 allowing the first part 9 and the second part 10 to slide against each other when performing rotational movements relative to each other. Thus, operating the yaw drives causes the second part 10 of the yawing arrangement 6 to rotate relative to the first part 9 of the yawing arrangement 6, and thereby the load carrying structure, being fixedly attached to the second part 10, performs yawing movements relative to the tower structure, being fixedly attached to the first part 9.

The first part 9 of the yawing arrangement 6 is provided with three connecting structures 13, arranged on an outer portion of the first part 9. Three guy wires 7 are connected to the first part 9, via the connecting structures 13. Accordingly, the guy wires 7 are connected to an outer portion of the first part 9 of the yawing arrangement 6.

At least the first part 9 of the yawing arrangement 6 may be a casted part, and the connecting structures 13 may be formed directly as a part of the casted part. This provides a very strong connection between the first part 9 of the yawing arrangement 6 and the guy wires 7 in a very cost effective manner.

Figure 5:
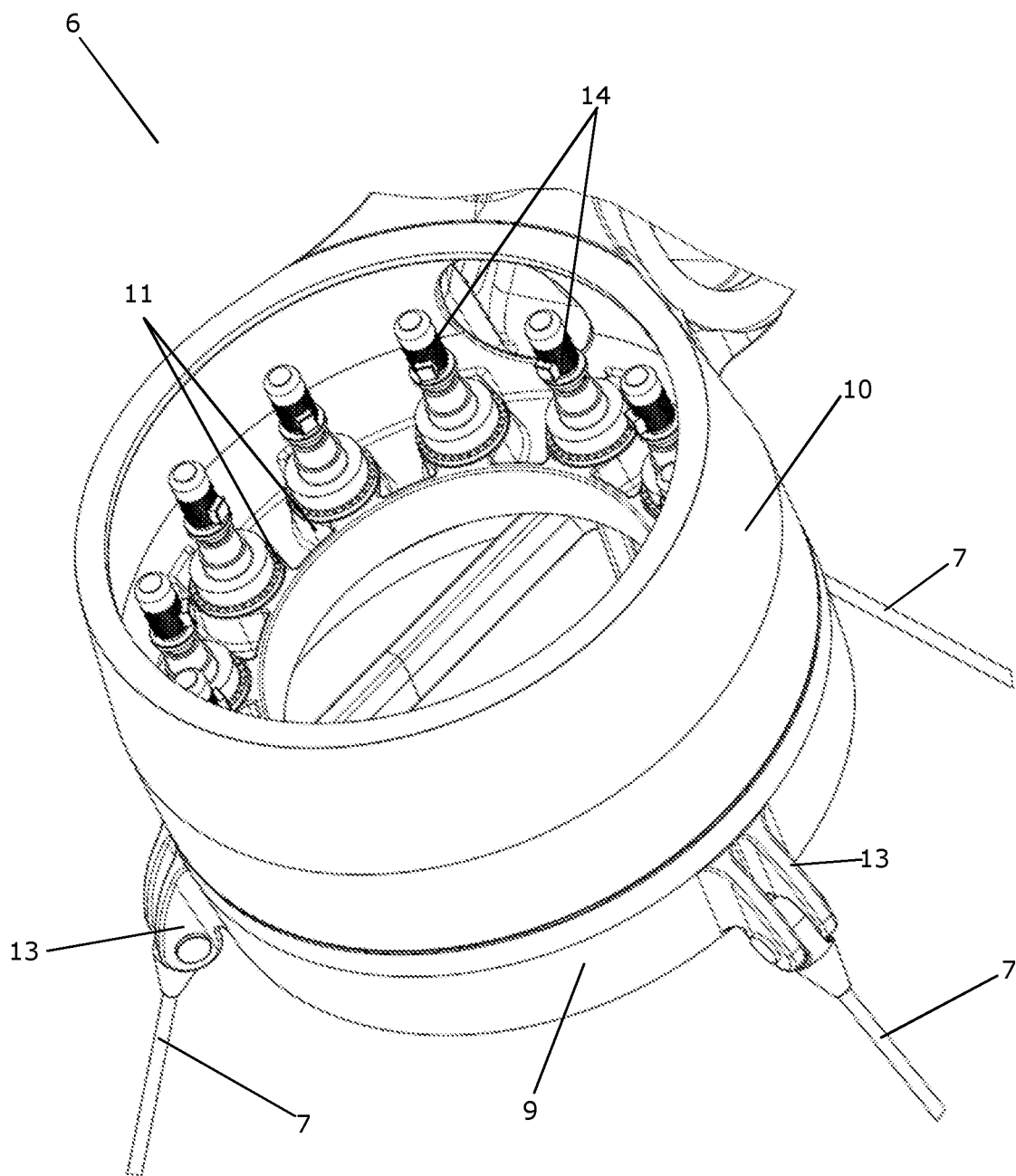
FIGS. 5-7 illustrate a yawing arrangement according to a second embodiment of the invention.
Figure 6:
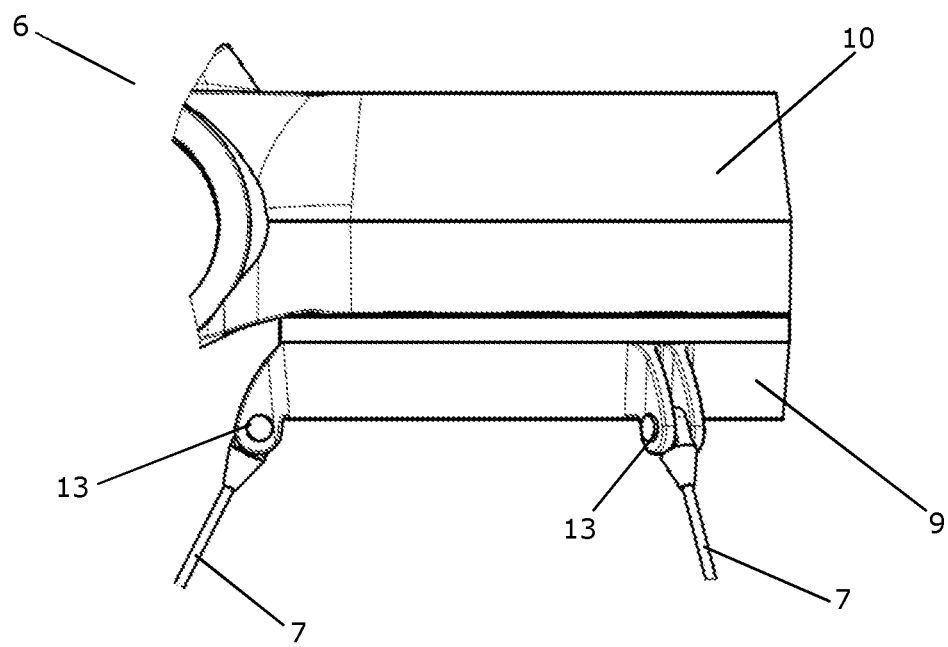
Figure 7:
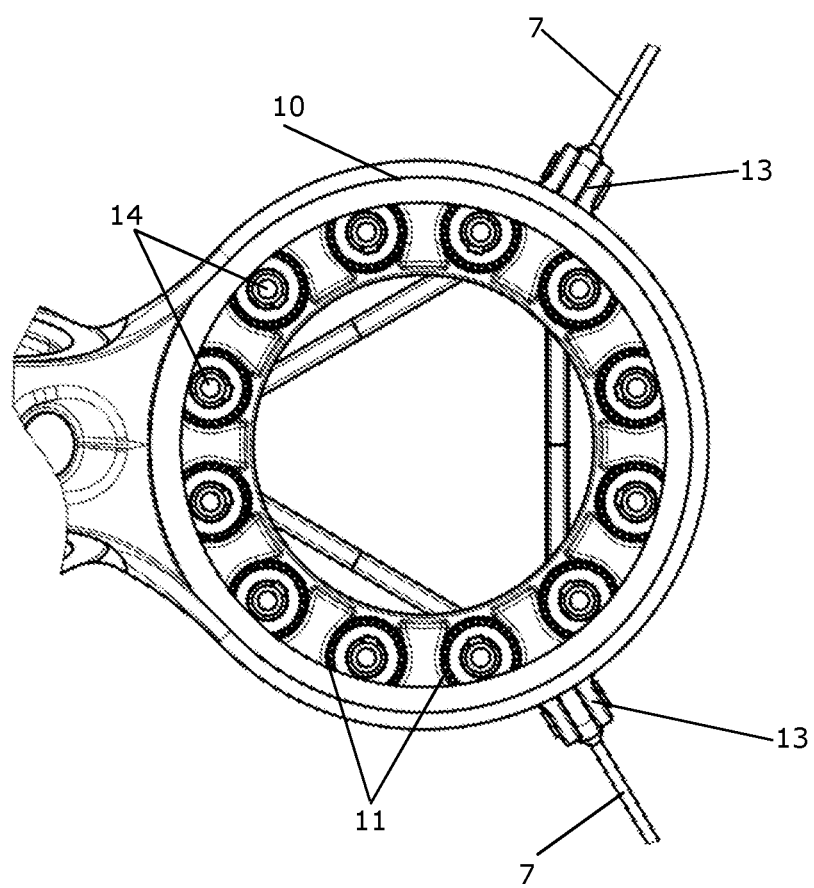

FIGS. 5-7 illustrate a yawing arrangement 6 according to a second embodiment of the invention. FIG. 5 is a perspective view of the yawing arrangement 6, FIG. 6 is a side view of the yawing arrangement 6, and FIG. 7 is a top view of the yawing arrangement 6. The yawing arrangement 6 of FIGS. 5-7 could, e.g., form part of the wind turbine 1 of FIG. 1.

The yawing arrangement 6 of FIGS. 5-7 is very similar to the yawing arrangement 6 of FIGS. 2-4, and it will therefore not be described in detail here. However, in the yawing arrangement 6 of FIGS. 5-7, the openings 11 being configured to receive yaw drives 14 are formed in the second part 10 of the yawing arrangement 6, and the first part 9 is in the form of a yaw ring. Furthermore, yaw drives 14 can be seen in the openings 11.

Figure 8:
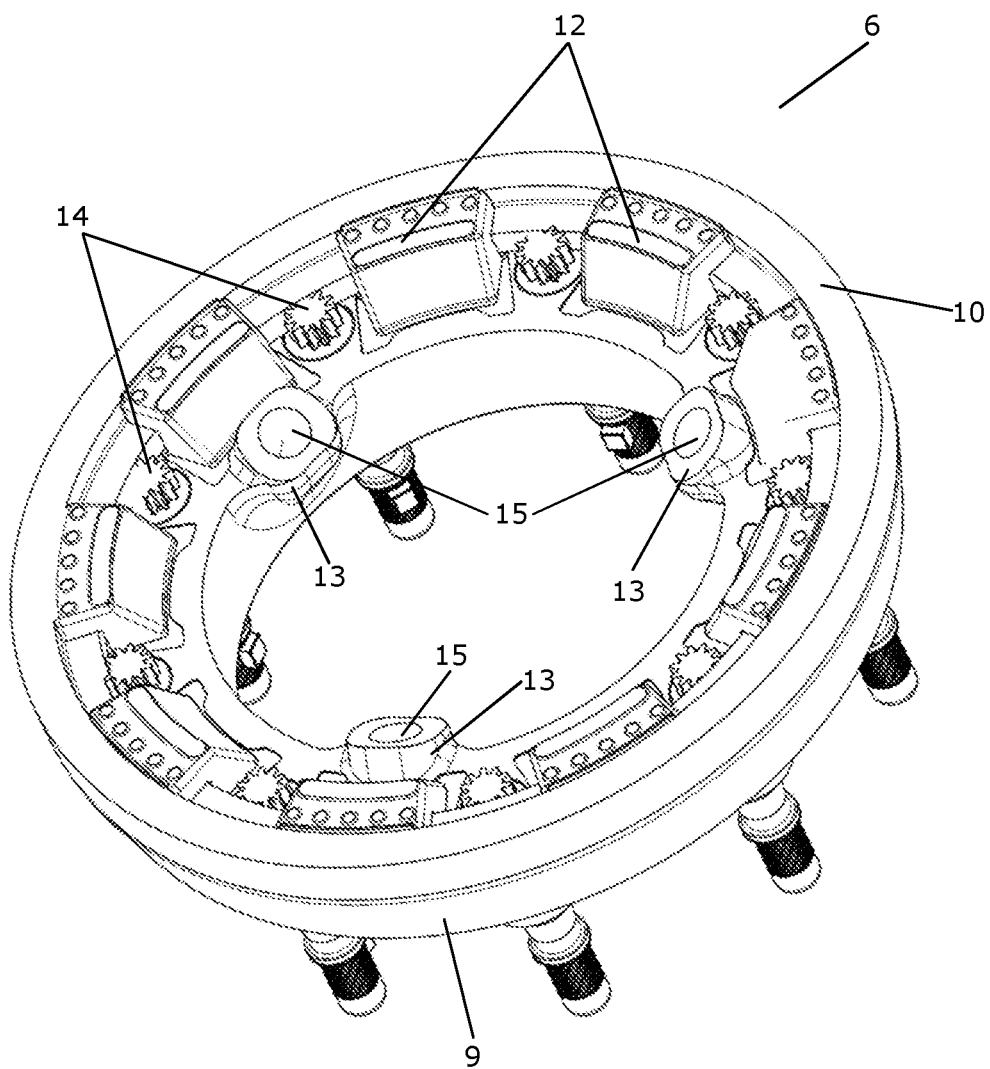
FIGS. 8-10 illustrate a yawing arrangement according to a third embodiment of the invention.
Figure 9:
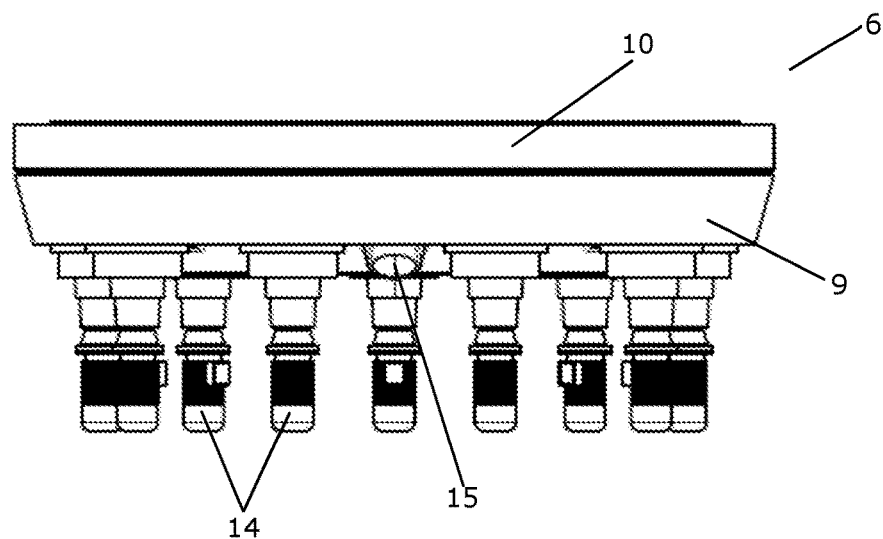
Figure 10:
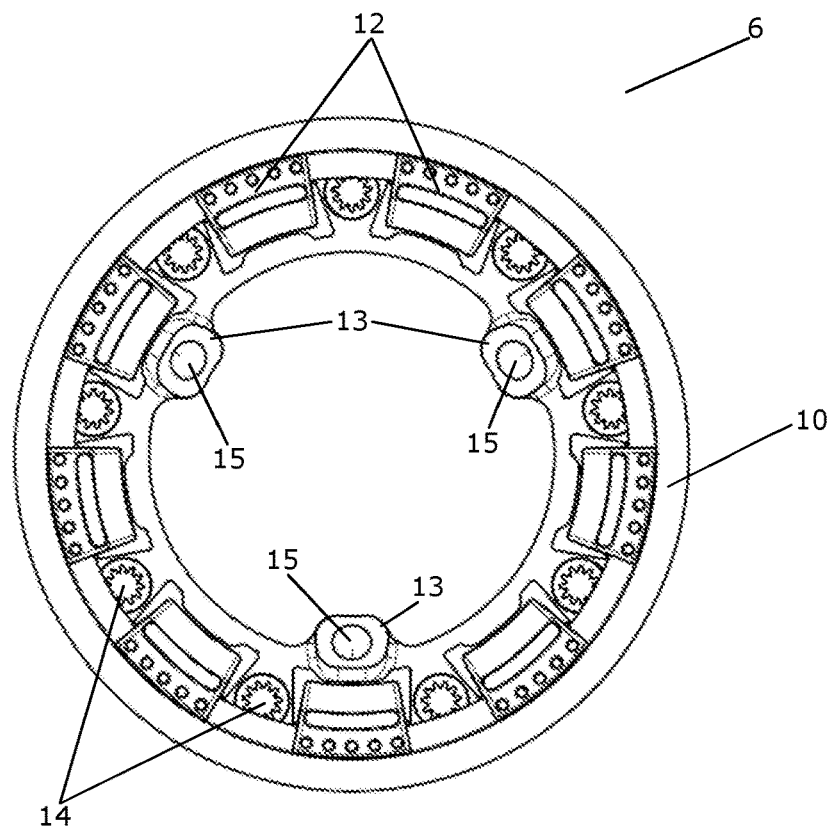

FIGS. 8-10 illustrate a yawing arrangement 6 according to a third embodiment of the invention. FIG. 8 is a perspective view of the yawing arrangement 6, FIG. 9 is a side view of the yawing arrangement 6, and FIG. 10 is a top view of the yawing arrangement 6. The yawing arrangement 6 of FIGS. 8-10 could, e.g., form part of the wind turbine of FIG. 1.

The yawing arrangement 6 of FIGS. 8-10 is very similar to the yawing arrangements 6 of FIGS. 2-4 and FIGS. 5-7, respectively, and it will therefore not be described in detail here. Thus, similarly to the yawing arrangement 6 of FIGS. 2-4, the first part 9 of the yawing arrangement of FIGS. 8-10 is provided with a number of yaw drives 14, and the second part 10 is in the form of a yaw ring. In FIGS. 8 and 10 it can be seen how the yaw drives 14 engage the yaw ring.

In the yawing arrangement 6 of FIGS. 8-10, the first part 9 of the yawing arrangement 6 is provided with three through-going passages 15, each allowing a guy wire (not shown) to extend through the first part 9 of the yawing arrangement 6. Connecting structures 13 for connecting guy wires to the first part 9 of the yawing arrangement are formed on an inner portion of the first part 9. Thus, according to this embodiment, the guy wires are connected to the inner portion of the first part 9 of the yawing arrangement 6, and extend through the first part 9 to the exterior, via the through-going passages 15.

Figure 11:
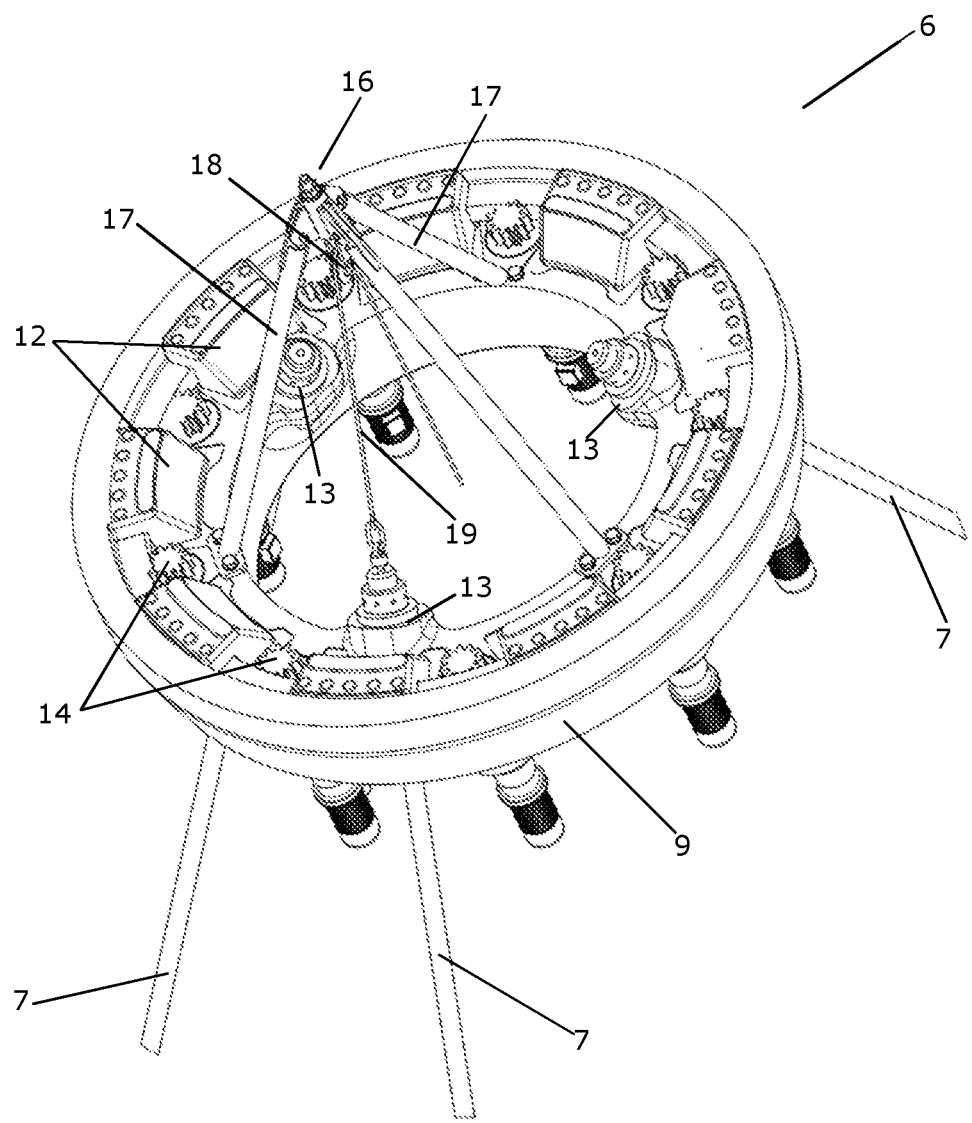
FIG. 11 shows the yawing arrangement of FIGS. 8-10 with a hoisting mechanism.

FIG. 11 is a perspective view of the yawing arrangement 6 of FIGS. 8-10 with a hoisting mechanism 16 mounted thereon. FIG. 11 further shows three guy wires 7, extending through the through-going passages and connected to the inner portion of the first part 9 of the yawing arrangement 6, via the connecting structures 13.

The hoisting mechanism 16 comprises three rod elements 17 and a pulley 18 having a pilot wire 19 mounted thereon. The pilot wire 19 is further connected to one of the guy wires 7. The hoisting mechanism 16 can be used when mounting the guy wires 7 on the first part 9 of the yawing arrangement 6 in the following manner.

The pilot wire 19 is mounted on the pulley 18, attached to a winch (not shown) and lowered towards the ground, via one of the through-going passages formed in the first part 9 of the yawing arrangement 6. At the ground, the pilot wire 19 is connected to a guy wire 7, and the guy wire 7 is then hoisted towards the yawing arrangement 6, along with the pilot wire 19, using the winch and the pulley 18. When the end of the guy wire 7 reaches the connecting structure 13, it is attached thereto, and the pilot wire 19 is released from the guy wire 7.

The hoisting mechanism 16 may be permanently mounted on the yawing arrangement 6. As an alternative, the hoisting mechanism 16 may be temporarily mounted on the yawing arrangement 6 when mounting of one or more guy wires 7 is required, in which case the hoisting mechanism 16 may be dismantled when the guy wire(s) 7 has/have been mounted on the first part 9 of the yawing arrangement 6.

The invention claimed is:

1. A multirotor wind turbine, comprising:
    a tower structure,
    at least one load carrying structure arranged to carry two or more energy generating units,
    a yawing arrangement comprising a first part being fixedly connected to the tower structure and a second part being fixedly connected to the at least one load carrying structure, the first part and the second part being configured to perform rotating movements relative to each other, thereby allowing the at least one load carrying structure to perform yawing movements relative to the tower structure, the first part comprising a plurality of through-going passages arranged on a circumference of an interior portion of the first part, and
    a plurality of guy wires being connected between an anchoring point at the ground and the first part of the yawing arrangement, wherein each of the plurality of guy wires extends through the first part of the yawing arrangement via a corresponding through-going passage, and wherein the plurality of guy wires is connected to the interior portion of the first part of the yawing arrangement.

2. The multirotor wind turbine according to claim 1, further comprising a hoisting mechanism arranged inside an outer periphery defined by the tower structure or the yawing arrangement, the hoisting mechanism being configured to hoist the plurality of guy wires to a mounting position.

3. The multirotor wind turbine according to claim 1, wherein the first part of the yawing arrangement is or comprises a yaw ring, and the second part of the yawing arrangement is or comprises one or more yaw drive units.

4. The multirotor wind turbine according to claim 1, wherein the first part of the yawing arrangement is or comprises one or more yaw drive units, and the second part of the yawing arrangement is or comprises a yaw ring.

5. The multirotor wind turbine according to claim 1, wherein the first part of the yawing arrangement is a casted part.

6. The multirotor wind turbine according to claim 1, wherein the at least one load carrying structure comprises two arms extending away from the tower structure, each arm being arranged to carry at least one energy generating unit of the two or more energy generating units.

7. A yawing arrangement for use in a multirotor wind turbine, the multirotor wind turbine comprising:
    a tower structure,
    at least one load carrying structure arranged to carry two or more energy generating units, and
    a plurality of guy wires,
    wherein the yawing arrangement comprises:
    a first part being configured to be fixedly connected to the tower structure; and
    a second part being configured to be fixedly connected to the at least one load carrying structure, the first part and the second part being configured to perform rotating movements relative to each other, wherein the first part is provided with a plurality of connecting structures for connecting the plurality of guy wires to the first part of the yawing arrangement, wherein the plurality of connecting structures is arranged on a circumference of an interior portion of the first part of the yawing arrangement, and wherein the first part of the yawing arrangement is further provided with a plurality of through-going passages allowing each of the plurality of guy wires to pass through the first part of the yawing arrangement via a respective one of the plurality of through-going passages.

* * * * *